United States Patent [19]
Niikura et al.

[11] Patent Number: 5,137,130
[45] Date of Patent: Aug. 11, 1992

[54] CONTROLLED TYPE ROTATION SPEED DIFFERENCE SENSITIVE COUPLING

[75] Inventors: Yasuhiro Niikura, Yokosuka; Toji Takemura, Yokohama; Koichi Kitamura, Yamato, all of Japan

[73] Assignee: Nissan Motor Co., Ltd., Yokohama, Japan

[21] Appl. No.: 517,764

[22] Filed: May 2, 1990

[30] Foreign Application Priority Data

May 10, 1989 [JP] Japan .................... 1-116636
Jun. 19, 1989 [JP] Japan .................... 1-156307

[51] Int. Cl.$^5$ .................... F16D 31/02; F16H 1/445
[52] U.S. Cl. .................... 192/60; 475/89; 475/99
[58] Field of Search .................... 192/60, 4 A; 475/84, 475/89, 93, 99

[56] References Cited

U.S. PATENT DOCUMENTS

| | | | |
|---|---|---|---|
| 1,436,753 | 11/1922 | Carpenter | 192/60 |
| 1,667,274 | 4/1928 | Walsh et al. | 192/60 |
| 2,022,663 | 12/1935 | Grey et al. | 192/60 |
| 2,352,023 | 6/1944 | Schuller | 360/108 |
| 2,498,801 | 2/1950 | Fraser | 192/60 |
| 3,229,794 | 1/1966 | Fraser | 192/60 |
| 4,825,989 | 5/1989 | Frigger | 192/4 A X |
| 4,899,859 | 2/1990 | Teraoka | 192/4 A |
| 4,913,270 | 4/1990 | Ishido et al. | 192/4 A |
| 4,934,497 | 6/1990 | Ishizeki et al. | 192/4 A X |
| 4,958,711 | 9/1990 | Okubo et al. | 192/60 |
| 5,024,309 | 6/1991 | Takemura et al. | 192/60 |

FOREIGN PATENT DOCUMENTS

| | | | |
|---|---|---|---|
| 365824 | 5/1990 | European Pat. Off. | |
| 1211193 | 3/1960 | France. | |
| 419294 | 11/1934 | United Kingdom | 192/60 |

*Primary Examiner*—Richard Lorence
*Attorney, Agent, or Firm*—Foley & Lardner

[57] ABSTRACT

A controlled type rotation speed difference sensitive coupling is disclosed, which is for use between first and second rotatable members. The coupling comprises a drive housing connected to the first rotatable member, a rotor connected to the second rotatable member and rotatably received in the housing, and driving pistons operatively carried by the rotor having head portions thereof slidably engaged with a cam surface wall formed on an inner surface of the drive housing. The rotor has at its center portion a spool chamber in which a spool is disposed. Balance passages and relief passages extend respectively between working chambers defined by the driving pistons and the spool chamber. Each balance passage has an orifice which is exposed to the spool chamber and closable by the spool. The orifice is non-circular in shape.

2 Claims, 14 Drawing Sheets

CONTROLLED TYPE ROTATION SPEED DIFFERENCE SENSITIVE COUPLING

BACKGROUND OF THE INVENTION

1. Field of the Invention

The present invention relates to an improvement in a so-called "controlled type rotation speed difference sensitive coupling" which is used in, for example, a driving power distributing device for a four-wheel drive motor vehicle, a differential gear arranged between left and right drive road wheels, a differential limiting device arranged between front and rear wheels and/or left and right drive road wheels, and the like.

2. Description of the Prior Art

In order to clarify the task of the present invention, one controlled type rotation speed difference sensitive coupling will be outlined with reference to FIGS. 23 and 24 of the accompanying drawings, which is disclosed in U.S. patent application Ser. No. 07/409,669 now U.S. Pat. No. 5,024,309 which was filed Sep. 20, 1989 in the name of Toji TAKEMURA et al.

The following description on the previously proposed coupling may be easily understood when taken in conjunction with FIGS. 5 and 6 because these drawings show a similar construction to the previously proposed coupling.

As may be seen from these drawings, the coupling comprises generally a drive housing (30), a rotor (40) rotatably disposed in the drive housing (30), six driving pistons (50) radially movably received in evenly spaced cylinder bores (42) formed in the peripheral portion of the rotor (40), six working chambers (60) defined in the cylinder bores (42) behind the pistons (50), six balance fluid passages (70) formed in the rotor 40 to communicate the working chambers (60) with a spool chamber (90) formed in the center of the rotor (40), six regulator relief fluid passages (80) formed in the rotor 40 to communicate the working chambers (60) and the spool chamber (90) under a given condition, a spool (73) movably disposed in the spool chamber (90) and an external actuator (not shown) which actuates or moves the spool (73) through a rod (74) extending from the spool (73).

Each of the balance fluid passages (70) has, at a portion exposed to the spool chamber (90), an orifice (70b). Thus, when, due to energization of the actuator, the spool (73) is moved in the spool chamber (90), the open degree of the six orifices (70b) is varied and thus, a hydraulic flow therethrough is controlled. With this operation, a controlled torque transfer is carried out between the drive housing (30) and the rotor (40).

However, due to an inherent construction, the coupling has the following drawback.

That is, as is shown in FIG. 23, the orifice (70b) of each balance fluid passage (70) is circular in shape. This means that the change in the open degree of the orifice (70b) relative to the moved distance of the spool (73) is very small at initial and final stages of the closing or opening stroke of the spool (73) and very large at a middle stage of the stroke. Accordingly, as is seen from the graph of FIG. 24, the raising of the torque transferred during closing stroke of the spool (73) is slow and a very sharp change in the transferred torque "T" appears at the final (or initial) stage of the closing (or opening) stroke of the spool (73). That is, the sharp change in the transferred torque "T" is induced by only a small moved distance of the spool (73) at such final or initial stage of the stroke. As is known to those skilled in the art, this phenomenon brings about a difficulty in achieving a precisely controlled torque transfer particularly when the external actuator is of a common type, that is, a type which fails to give a precise movement to the spool (73) at such final or initial stage of the stroke.

If elimination of such drawback is intended by replacing the common type actuator with a precision actuator, it is inevitably necessary to sacrifice the cost reduction.

SUMMARY OF THE INVENTION

It is therefore an object of the present invention to provide a controlled type rotation speed sensitive coupling which is free of the above-mentioned drawback.

According to the present invention, there is provided a coupling for use between first and second rotatable members, which comprises a drive housing connected to the first rotatable member to rotate therewith, the housing having on its inner surface a cam surface wall; a rotor rotatably received in the drive housing, the rotor having radially extending piston bores formed therein; driving pistons respectively received in the piston bores thereby to define working chambers in the piston bores, the working chambers being filled with oil causing head portions of the driving pistons to slidably contact with the cam surface wall; means defining in a rotation center portion of the rotor a spool chamber; first passage means connecting each of the working chambers with the spool chamber, the first passage means including an orifice exposed to the spool chamber; second passage means connecting each of the working chambers with the spool chamber, the second passage means including a check means by which only one-way flow of oil from the spool chamber to the working chamber is permitted; and a spool slidably disposed in the spool chamber, the spool varying the open degree of the orifice when moved axially, wherein the orifice is non-circular in shape.

BRIEF DESCRIPTION OF THE ACCOMPANYING DRAWINGS

Other objects and advantages of the present invention will become apparent from the following description when taken in conjunction with the accompanying drawings, in which.

DETAILED DESCRIPTION OF THE INVENTION

Referring to FIGS. 1 to 8, there is shown a first embodiment of the present invention, which is a controlled type rotation speed difference sensitive coupling. The coupling is denoted by reference "A".

Figure 3:
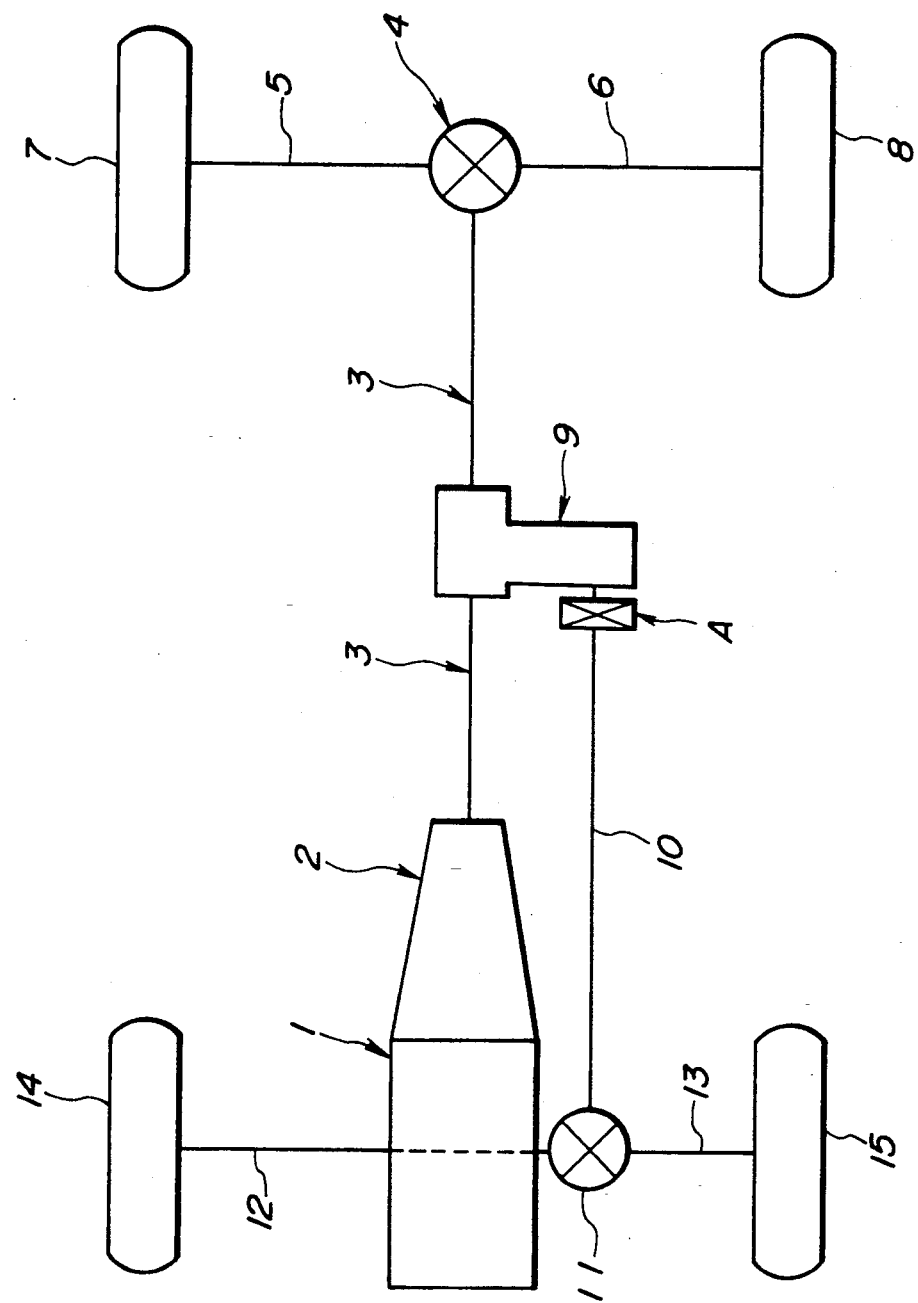
FIG. 3 is a diagrammatically illustrated drive train of a four wheel drive motor vehicle to which the coupling of the first embodiment is practically applied as being incorporated with a transfer gear.

As will be seen from FIG. 3, the coupling "A" of the first embodiment is incorporated with a transfer gear of a 4WD (viz., four wheels drive) system to serve as a driving torque distribution controller by which the driving torque applied to the front wheels is controlled.

The 4WD system shown in FIG. 3 comprises a rear wheel drive part which includes an engine 1, a transmission 2, a rear propeller shaft 3, a rear differential 4, rear drive shafts 5 and 6, and rear road wheels 7 and 8, and a front wheel drive part which includes a transfer gear 9, the rotation speed difference sensitive coupling "A", a front propeller shaft 10, a front differential 11, front drive shaft joints 12 and 13 and front road wheels 14 and 15.

Figure 4:
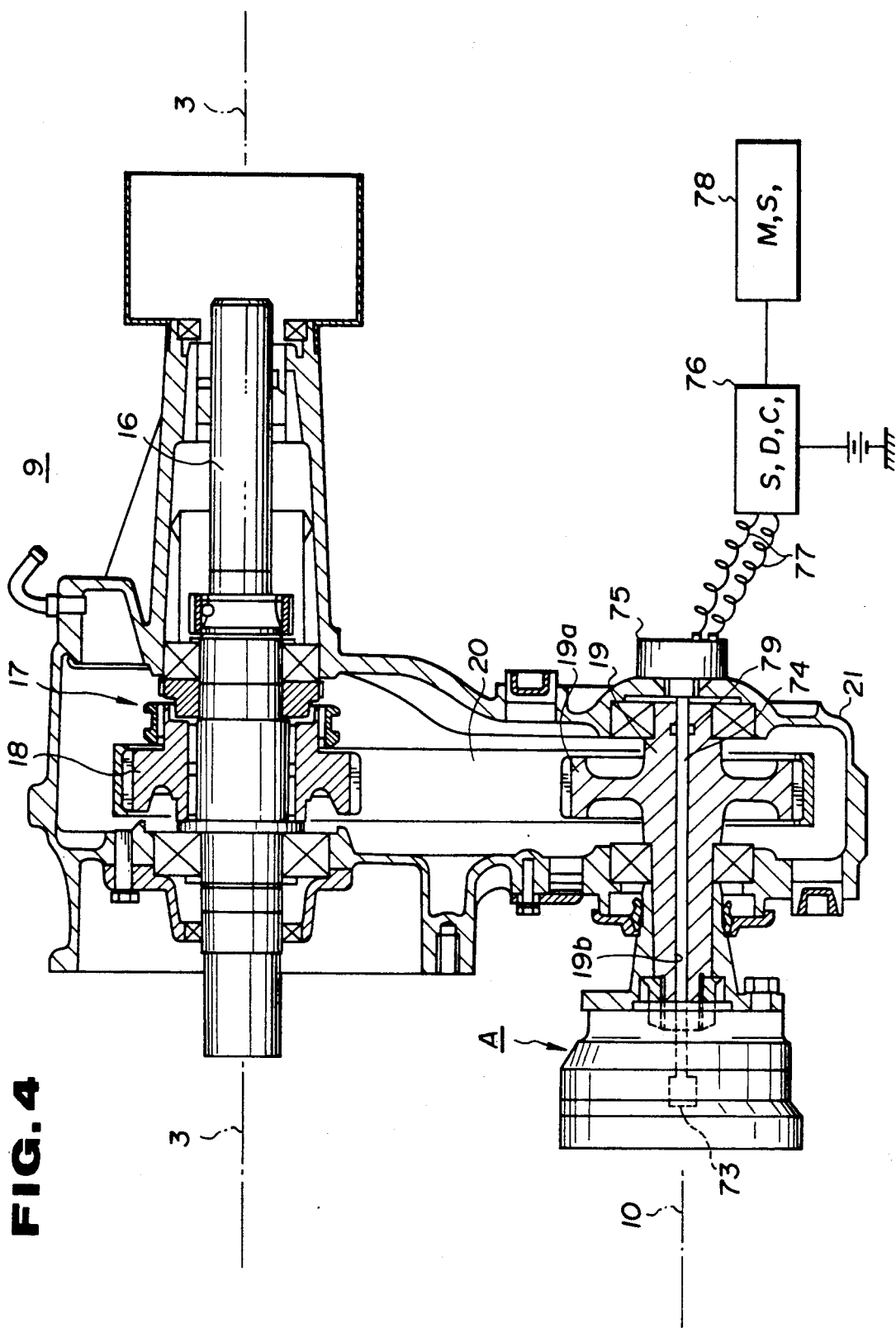
FIG. 4 is a sectional view of the transfer gear to which the coupling of the invention is practically applied.

As is well shown in FIG. 4, the transfer gear 9 comprises an input shaft 16 which is coaxially connected to the rear properller shaft 3 to serve as an intermediate part of the same, an input pulley 18 which is selectively connectable to the input shaft 16 through a 2WD/4WD switching clutch 17, an output shaft 19 which is coaxially connected to the front propeller shaft 10 through the coupling "A", a driving belt 20 which is put around the input pulley 18 and an output pulley 19a which is integral with the output shaft 19, and a casing 21.

Figure 5:
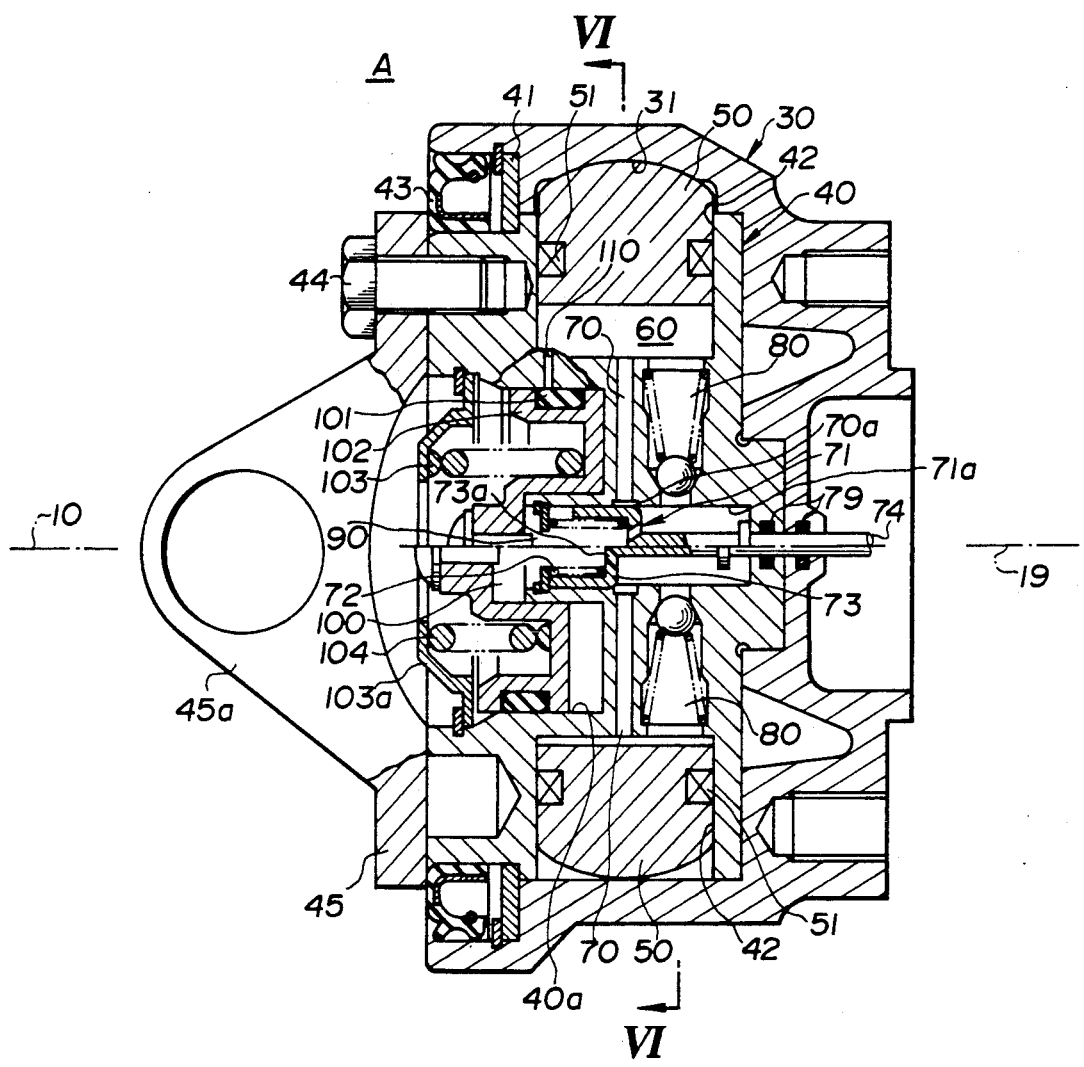
FIG. 5 is a sectional view of the coupling of the first embodiment, which is taken along the line V—V of FIG. 6.
Figure 6:
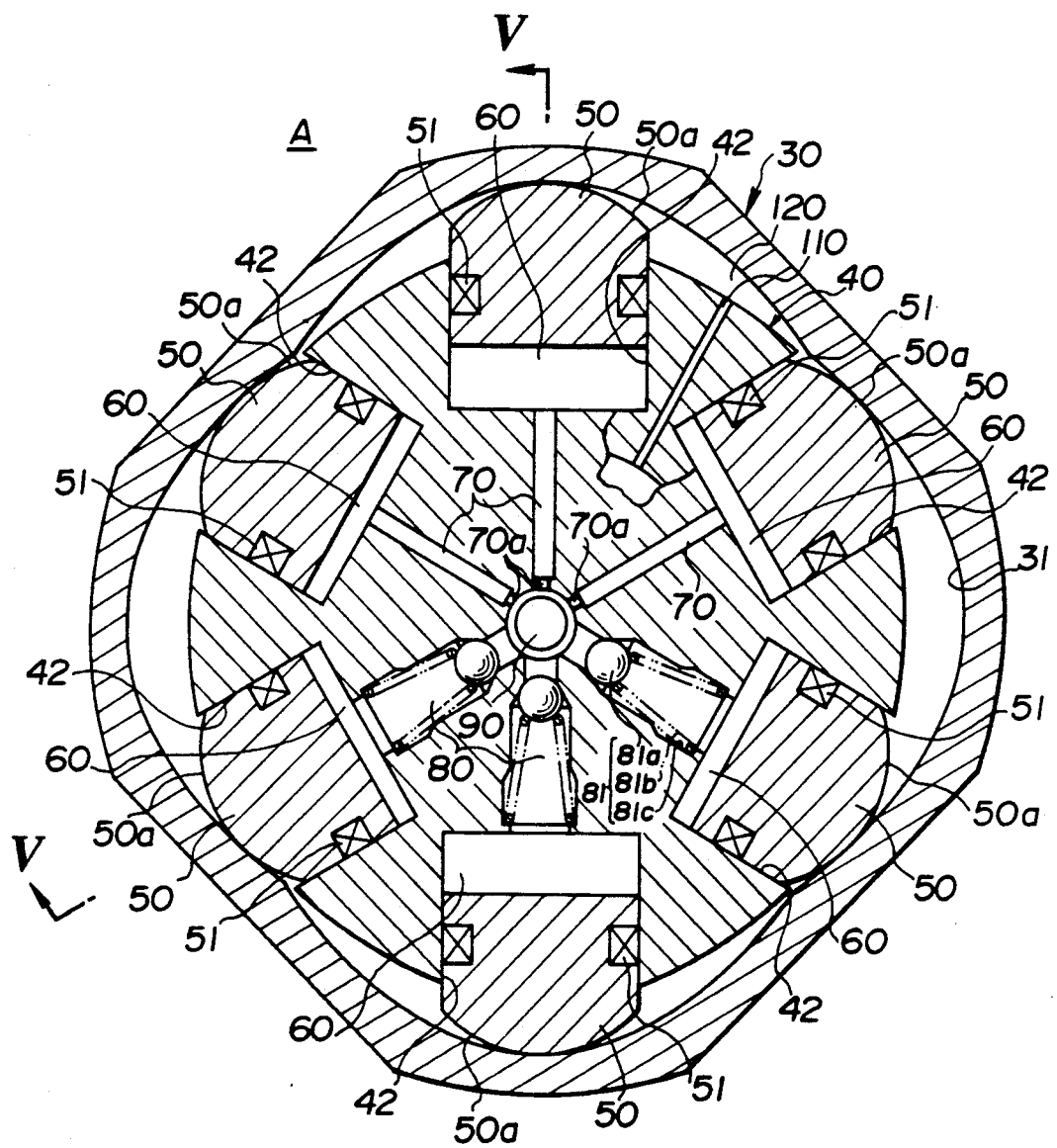
FIG. 6 is a sectional view taken along the line VI—VI of FIG. 5.

The detail of the coupling "A" is shown in FIGS. 5 and 6. The coupling "A" comprises generally a drive housing 30, a rotor 40, six driving pistons 50, six working chambers 60, six balance fluid passages 70, six regulator relief fluid passages 80, a spool chamber 90, an accumulator chamber 100 and accumulator relief fluid passages 110, which are constructed and arranged in an after-mentioned manner.

The drive housing 30 is coaxially connected to the above-mentioned output shaft 19 by means of bolts or the like. The drive housing 30 is formed on its inner surface with four evenly spaced recesses which thus constitute a circumferential cam surface wall 31. The cam surface wall 31 is so shaped that the sum of the torques transferred via the coupling upon occurence of relative rotation between the drive housing 30 and the rotor 40 is substantially constant throughout every relative positions which the drive housing 30 and the rotor 40 assume.

The rotor 40 is rotatably received in the drive housing 30 and coaxially connected to the above-mentioned front propeller shaft 10 by means of bolts or the like. As is seen from FIG. 5, an annular stopper ring 41 is fitted to a mouth portion of the drive housing 30 for rotatably holding the rotor 40 in the drive housing 30.

As is best seen from FIG. 6, the rotor 40 is formed at a radially outer portion thereof with six evenly spaced cylinder bores 42 which accommodate the six driving pistons 50. Coaxially mounted on the stopper ring 41 is an annular seal 43 which hermetically seals a possible but limited clearance between the rotor 40 and the drive housing 30. Connected to the outside portion of the rotor 40 through bolts 44 is a circular flange 45. As shown, the circular flange 45 has a diameter somewhat greater than the inner diameter of the annular seal 43. The circular flange 45 has a connector 45a integral thereto. The connector 45a is connected to the front propeller shaft 10 in a known manner.

The driving pistons 50 are sealingly and movably disposed in the respective cylinder bores 42. For achieving the sealing, each driving piston 50 has a seal ring 51 operatively fitting in an annular groove (no numeral) formed therein. As shown in the drawings, each driving piston 50 has a cam-shaped head portion.

As is well shown in FIG. 6, the six driving pistons 50 contact at the cam-shaped head portions thereof with the cam surface wall 31 of the drive housing 30 at angular intervals of 60 degrees. Thus, upon occurence of relative rotation between the drive housing 30 and the rotor 40, the driving pistons 50 are subjected to a reciprocating movement in the associated cylinder bores 42. It is to be noted that in order to achieve a smooth contact against the cam surface wall 31 and increase the Hertz's contact pressure for bearing a high torque, the cam-shaped head portion of each piston 50 has a spherically protruded center portion 50a as will be understood when the pistons 50 illustrated in FIGS. 5 and 6 are viewed.

The working chambers 60 are each defined in the cylinder bore 42 behind the driving piston 50, so that with the reciprocating movement of the piston 50, the volume of the working chamber 60 is varied.

As is understood from FIGS. 5 and 6, the spool chamber 90 is formed in the central portion of the rotor 40. The six balance fluid passages 70 extend radially outwardly from the spool chamber 90 at evenly angular intervals and lead to the respective working chambers 60, so that every two of the passages 70 are coaxially aligned with an interposal of the spool chamber 90. The balance fluid passages 70 are each a passage which, with an aid of an orifice open degree changing means 71, produces a hydraulic pressure which varies in accordance with the amount of fluid discharged from the working chamber 60.

Figure 1:
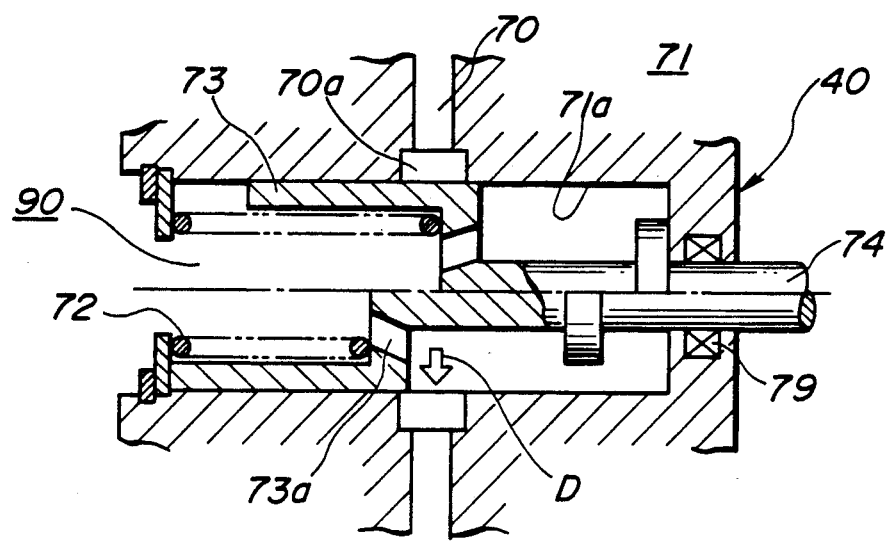
FIG. 1 is a sectional view of an essential part of a controlled type rotation speed difference sensitive coupling, which is a first embodiment of the present invention.

FIG. 1 shows the detail of the orifice open degree changing means 71. As shown, the orifice open degree changing means 71 generally comprises a cylindrical bore 71a formed in the center portion of the rotor 40, a spool 73 sealingly and slidably disposed in the cylindrical bore 71a and a coil spring 72 disposed in the bore 71a to bias the spool 73 in a given direction, that is, rightward in FIG. 1. Each balance fluid passage 70 has, at a portion exposed to the cylindrical bore 71a, an orifice 70a whose open degree is varied by the spool 73.

Figure 2:
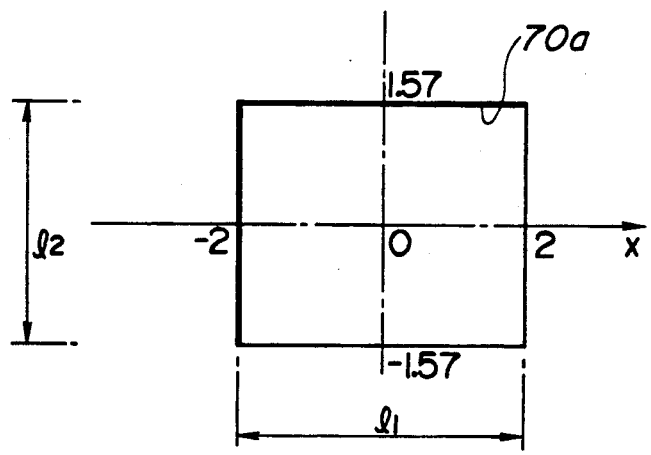
FIG. 2 is an enlarged view taken from the direction of the arrow "D" of FIG. 1, showing an orifice possessed by each of balance fluid passages.

As is seen from FIG. 2 which is the view taken from the direction of the arrow "D" of FIG. 1, the orifice 70a is rectangular in shape which includes a longer side "$l_1$" (about 4 mm in length) in the direction of "x" along which the spool 73 slides and a shorter side "$l_2$" (about 3.14 mm in length) in the direction perpendicular to the direction "x".

Figure 23:
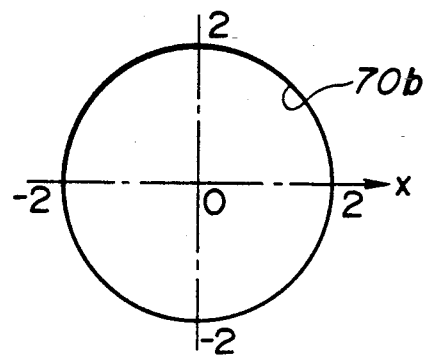
FIG. 23 is a view similar to FIG. 2, but showing an orifice which is employed in a previously proposed coupling.

It is to be noted that the area possessed by the orifice 70a is the same as that possessed by the circular orifice "70a" (about 4 mm in diameter) which is employed in the previously proposed device shown in FIG. 23. It is to be noted that this equality facilitates the performance comparison between the invention and the previously proposed one.

As is seen from FIGS. 1 and 5, the spool 73 has an axially extending rod 74 integral therewith.

As is shown in FIGS. 4 and 5, passing through the center portion of the rotor 40 and a center passage 19b of the output shaft 19, the rod 74 leads to a solenoid type actuator 75 which is connected to the transfer casing 21. As is shown in FIG. 4, the actuator 75 is connected through electric wires 77 to a solenoid drive circuit 76 which is, in turn, connected to a mode switch 78 by which a full-auto 4WD mode and a fixed 4WD mode of the transfer gear 9 are manually or automatically selected.

As is best seen in FIG. 1, the spool 73 is formed with a plurality of apertures 73a through which right and left chambers bounded by the spool 73 are communicated. As shown in FIGS. 4 and 5, several O-rings 79 are operatively disposed about the rod 74 to achieve a hermetical sealing against the output shaft 19, the drive housing 30 and the rotor 40.

As is understood from FIGS. 5 and 6, the six regulator relief fluid passages 80 extend radially outwardly from the spool chamber 90 at evenly angular intervals and lead to the respective working chambers 60, so that every two of the passages 80 are coaxially aligned with an interposal of the spool chamber 90. The regulator relief fluid passages 80 are each a passage which, with an aid of a one-way valve 81, supplies the working chamber 60 with a suitable liquid such as oil when the driving piston 50 is under an intake stroke, that is, when the piston 50 moves radially outwardly.

As is understood from FIG. 5, the spool chamber 90, more specifically, the left part of the spool chamber 90 serves as a part of the accumulator chamber 100. The accumulator chamber 100 is a chamber for controlling the amount of the oil supplied to the working chambers 60. The accumulator chamber 100 comprises a piston 102 sealingly and movably disposed in an annular recess 40a formed in the rotor 40, an annular seal 101 disposed about the piston 102 to assure sealing between the piston 102 and an outer wall of the annular recess 40a, and a coil spring 104 compressed between the piston 102 and a spring retainer 103 to bias the piston 102 rightward in FIG. 5. As shown in FIG. 5, the spring retainer 103 is formed on a cap 103a which is fixed to the rotor 40.

The accumulator relief fluid passages 110 are formed in the rotor 40 for setting the maximum hydraulic pressure (viz., the maximum torque transferred) produced in the accumulator chamber 100. For achieving this, each of the passage 110 connects the accumulator chamber 100 and a drain chamber 120 which is defined by the cam surface wall 31, the peripheral wall of the rotor 40 and the head portions of the driving pistons 50 (see FIG. 6).

As will be understood from FIG. 5, when the hydraulic pressure in the accumulator chamber 100 is in a low range, the relief fluid passages 110 are blocked by the annular seal 101 of the piston 102.

In the following, operation will be described.

(A) Under full-auto 4WD mode

When, with the 2WD-4WD switching clutch 17 (see FIG. 4) assuming the 4WD position, the mode switch 78 is turned to the full-auto 4WD mode, the solenoid drive circuit 76 operates the solenoid type actuator 75 in a manner to push the rod 74 leftward in FIG. 4. With this, as is seen from FIGS. 1 and 5, the spool 73 is moved leftward and assumes a leftmost position (as illustrated by the lower half of the spool 73), so that the six balancing fluid passages 70 are opened to the spool chamber 90 through the respective orifices 70a.

(A-a) Under $\Delta N = 0$

When now a motor vehicle runs straightly on a dried paved road at low or middle speed, there is produced no rotation speed difference "$\Delta N$" between the front and rear wheels. Under this condition, there is produced no relative rotation between the drive housing 30 and the rotor 40, and thus reciprocating movements of the driving pistons 50 do not occur. Thus, the coupling "A" does not produce a transferred torque "$\Delta T$" applied to the front road wheels 14 and 15. Thus, under this condition, the engine torque is applied to only the rear road wheels 7 and 8.

However, when the motor vehicle runs at high speed straightly on a highway or the like, the rotor 40 is forced to rotate at a high speed by the front drive wheels 14 and 15. Under this condition, the driving pistons 50 carried by the rotating rotor 40 are forced to abut against the cam surface wall 31 due to a considerable centrifugal force produced by the same, and thus a driving torque corresponding to the produced centrifugal force is transferred to the front road wheels 14 and 15. Thus, a so-called "high speed straight running stability" of the vehicle is improved.

(A-b) Under $\Delta N > 0$

When, due to running on a slippery surface, during rapid acceleration, or when driving on rough roads, the constantly driven rear road wheels 7 and 8 are subjected to a slippage, there is produced a rotation speed difference "$\Delta N$" between the front and rear road wheels. Under this condition, there is produced a relative rotation between the drive housing 30 and the rotor 40, and thus, the six driving pistons 50 are forced to move reciprocatively in the respective cylinder bores 42. During the time for which each driving piston 50 is moved toward the center of the rotor 40, the hydraulic pressure in the working chamber 60 is increased due to resistance by the orifice open degree changing means 71. Thus, the driving pistons 50 are forced to abut against the cam surface wall 31 with a certain force which is produced by multiplying the increased value of the pressure in the working chamber 60 by the pressure receiving surface area of the piston 50. The certain force has a certain driving torque "$\Delta T$" transferred from the rear road wheels 7 and 8 to the front road wheels 14 and 15.

Figure 7:
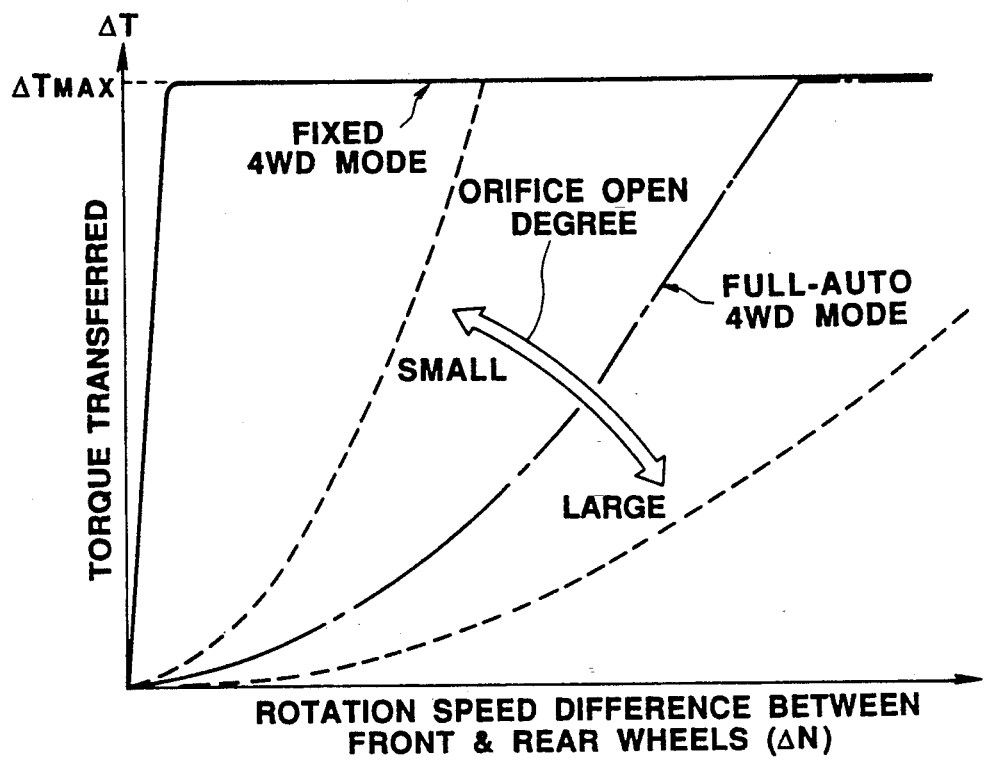
FIG. 7 is a graph showing a torque transfer character of the transfer gear in two operation modes, one being a full-auto 4WD mode and the other being a fixed 4WD mode.

Since the pressure difference between the front and rear portions of the spool chamber 90 increases as the rotation speed difference "$\Delta N$" between the drive housing 30 and the rotor 40 increases, the driving torque "$\Delta T$" transferred to the front road wheels 14 and 15 shows such a characteristic as is depicted by the dash-dot quadratic curve shown in FIG. 7.

As is shown in the graph of FIG. 7, by varying the open degree of the orifices 70a by moving the spool 73, the characteristic of the transferred torque is varied within a range defined between two curves illustrated by broken lines.

Accordingly, in case wherein the rear road wheels 7 and 8 are subjected to slippage, the driving torque distribution is automatically controlled between the front wheel driving condition and the four wheel driving condition in accordance with the degree of the slippage, so that the slippage of the rear road wheels 7 and 8 is suppressed. Thus, the vehicle traction performance against wet, snow-covered and/or muddy roads is improved.

It is to be noted that the provision of the accumulator relief fluid passages 110 allows the torque transferred to the front road wheels 14 and 15 to have the maximum value "$\Delta T_{MAX}$".

(B) Under fixed 4WD mode

When, with the 2WD-4WD switching clutch 17 assuming the 4WD position, the mode switch 78 is turned to the fixed 4WD mode, the solenoid drive circuit 76 operates the solenoid type actuator 75 in a manner to pull the rod 74 rightward in FIG. 4. With this, as is seen from FIGS. 1 and 5, the spool 73 moves rightward and assumes a rightmost position (as illustrated by the upper half of the spool 73), so that the six balancing fluid passages 70 are blocked from the spool chamber 90.

Under this condition, with the working chambers 60 kept filled with the oil, the abutment of the driving pistons 50 against the cam surface wall 31 is achieved for the torque transfer by only a small rotation speed difference "$\Delta N$" between the front and rear road wheels. That is, under this condition, such characteristic as depicted by the solid line in the graph of FIG. 7 is exhibited, and thus, the rear propeller shaft 3 and the front propeller shaft 10 are directly connected to accomplish the four wheel driving condition of the vehicle. It is to be noted that the torque transferred to the front drive wheels 14 and 15 has the maximum value of "$\Delta T_{MAX}$".

In the fixed 4WD mode, the undesirable power transfer loss is negligible as compared with that produced in the full-auto 4WD mode. Furthermore, since, in the fixed 4WD mode, the undesired heat generation is negligible, the fixed 4WD mode can be used continuously for a long time. Thus, the vehicle traction performance against rough roads, snow-covered roads, iced roads and the like is assured.

Figure 8:
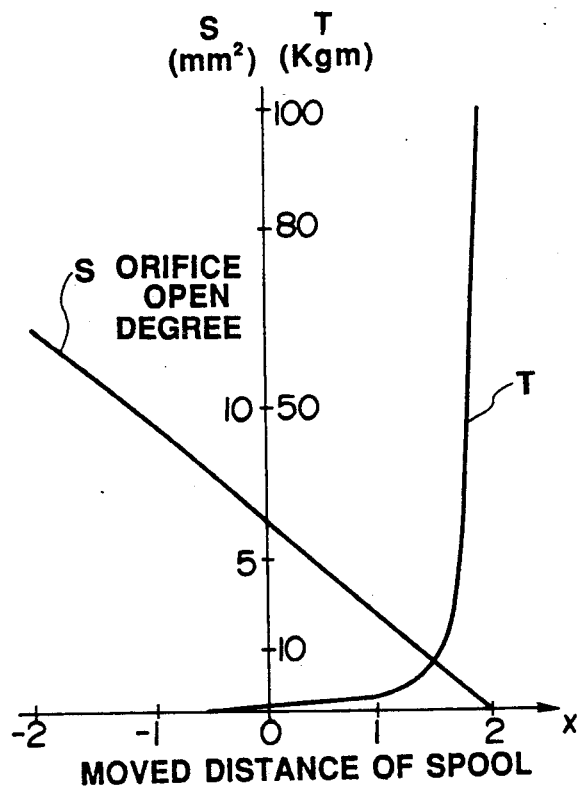
FIG. 8 is a graph showing a performance of the first embodiment in terms of relationship between the moved distance of a spool and an open degree of an orifice, and relationship between the moved distance of the spool and torque transmitted.

When the spool 73 moves in the cylindrical bore 71a of the spool chamber 90 varying the opening degree of the orifices 70a of the balance fluid passages 70, the coupling "A" exhibits such characteristics as shown in the graph of FIG. 8. That is, the graph shows both a relationship between the open degree "S" of each orifice 70a and the moved distance "x" of the spool 73 and a relationship between transferred torque "T" and the moved distance "x".

As is seen from this graph, the change in the open degree "S" of each orifice 70a relative to the moved distance "x" is constant. That is, the increasing or decreasing rate of the open degree "S" relative to the moved distance "x" changes linearly. This is because each orifice 70a is rectangular in shape as has been mentioned hereinabove.

Figure 24:
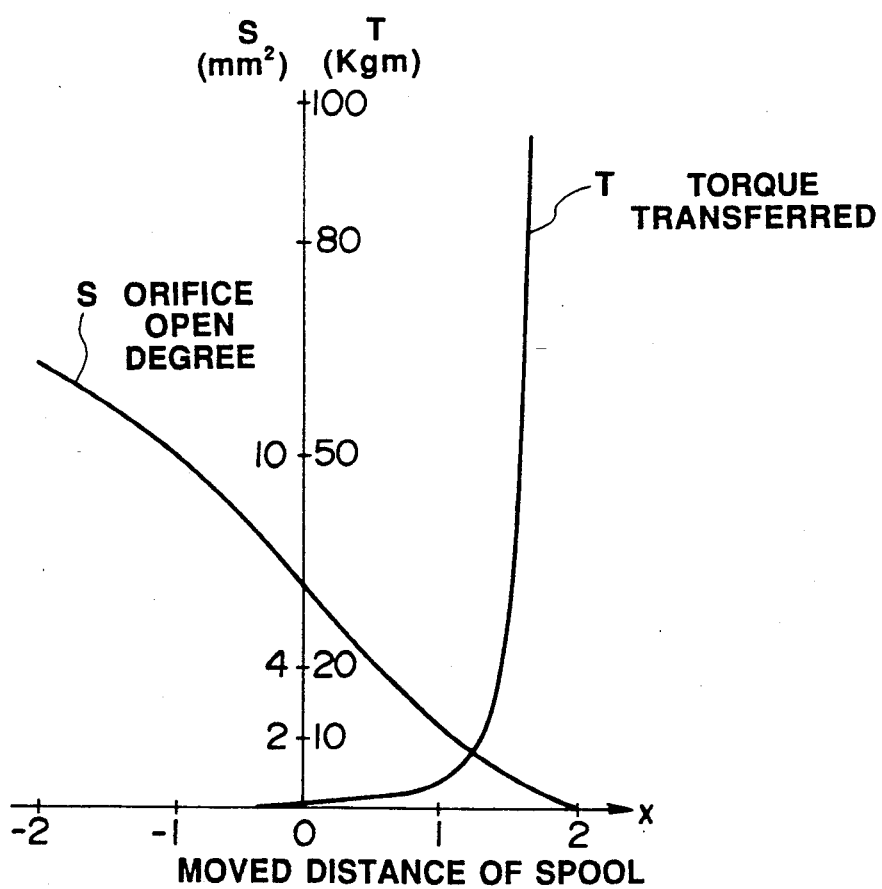
FIG. 24 is a graph similar to FIG. 8, but showing the performance of the previously proposed coupling.

In order to clarify the advantage given by the rectangular orifice 70a used in the first embodiment of the present invention, the graph of FIG. 8 of the first embodiment and the graph of FIG. 24 of the previously proposed coupling will be compared and discussed in the following.

As is understood from these graphs, in order to transfer a given torque of 100 kgm, the spool 73 must move about 1.7 mm in case of the previously proposed coupling but about 1.9 mm in case of the first embodiment of the present invention. That is, in the invention, greater moved distance "x" is needed by the spool 73 for achieving a predetermined torque transfer than that needed in case of the previously proposed coupling. This means that the operation accuracy of the coupling "A" of the invention is assured.

Figure 9:
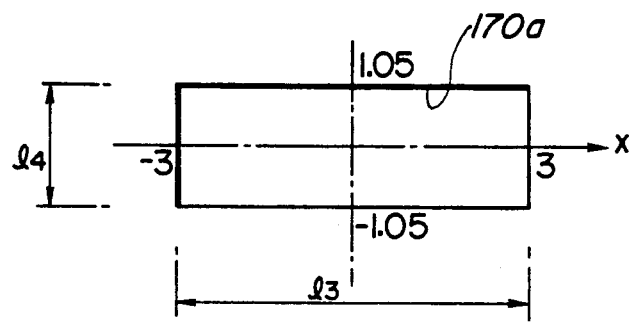
FIG. 9 is a view similar to FIG. 2, but showing a second embodiment of the present invention.

Referring to FIG. 9, there is shown an orifice 170a of each balance fluid passage employed in the second embodiment of the present invention. The orifice 170a of this embodiment includes a longer side "$l_3$" (about 6 mm in length) and a shorter side "$l_4$" (about 2.1 mm in length). The open area of the orifice 170a is the same as that of the circular orifice "70a" employed in the previously proposed coupling shown in FIG. 23.

Figure 10:
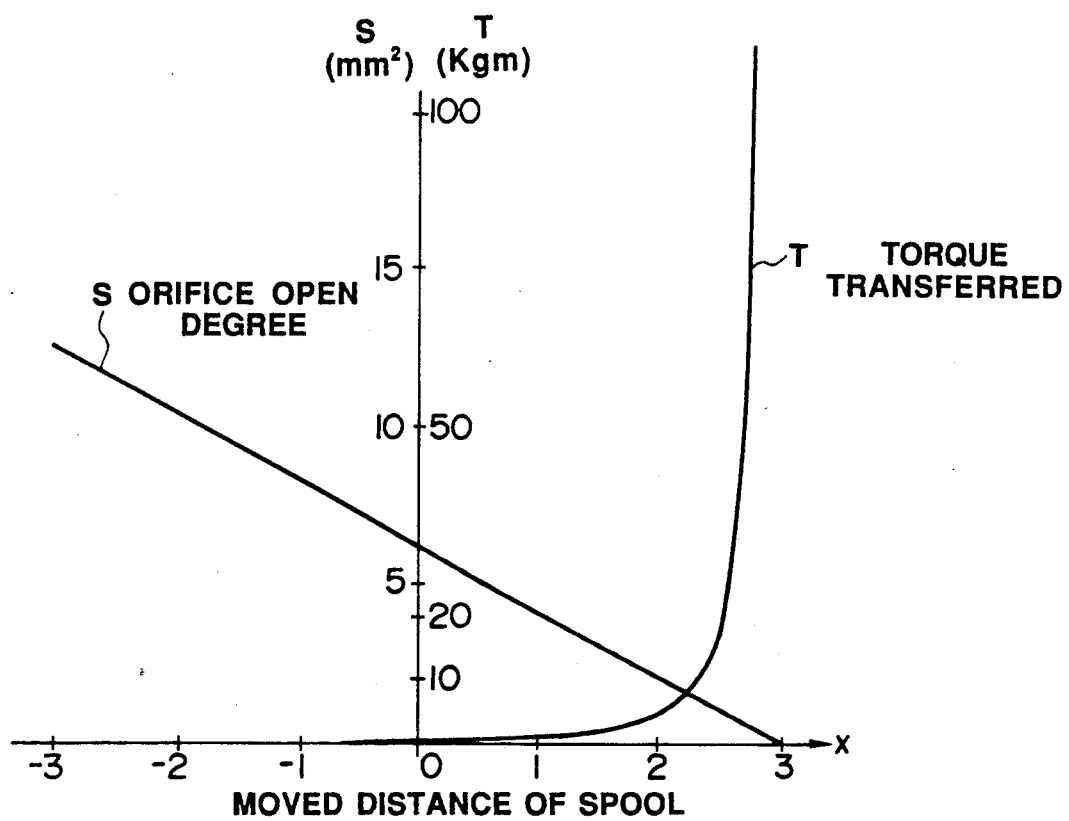
FIG. 10 is a graph similar to FIG. 8, but showing the performance of the coupling of the second embodiment.

The characteristics of the second embodiment are shown in the graph of FIG. 10. As is seen from this graph, the change in the open degree "S" of each orifice 170a and the transferred torque "T" relative to the moved distance "x" of the spool 73 are less than those in case of the above-mentioned first embodiment. This means that more precise torque transfer control is assured in the second embodiment than in the first embodiment.

As will be understood from the above, as the length of the longer side "$l_3$" of the orifice 170a increases, more precise torque transfer control is obtained.

Although the first and second embodiments employ rectangular orifices 70a and 170a each having four angular corners, the orifice may be oval so long as the longer axis thereof extends in the direction along which the spool 73 moves.

Figure 11:
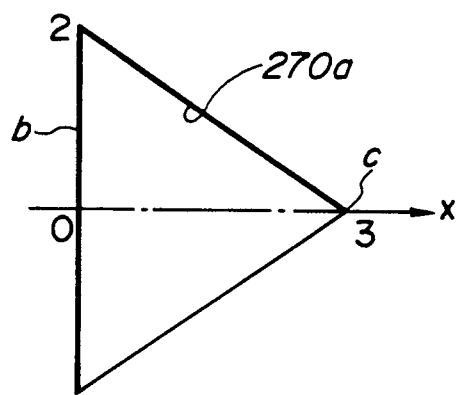
FIG. 11 is a view similar to FIG. 2, but showing a third embodiment of the present invention.

Referring to FIG. 11, there is shown an orifice 270a of each balance fluid passage employed in the third embodiment of the present invention. The orifice 270a of this third embodiment is triangular in shape, which comprises a base side "b" which extends perpendicular to the axis "x" along which the spool 73 moves and an apex "c" which is positioned on the axis "x". It is to be noted that under opening stroke of the spool 73, the same moves leftward in FIG. 11 gradually increasing the open degree of the orifice 270a.

Figure 12:
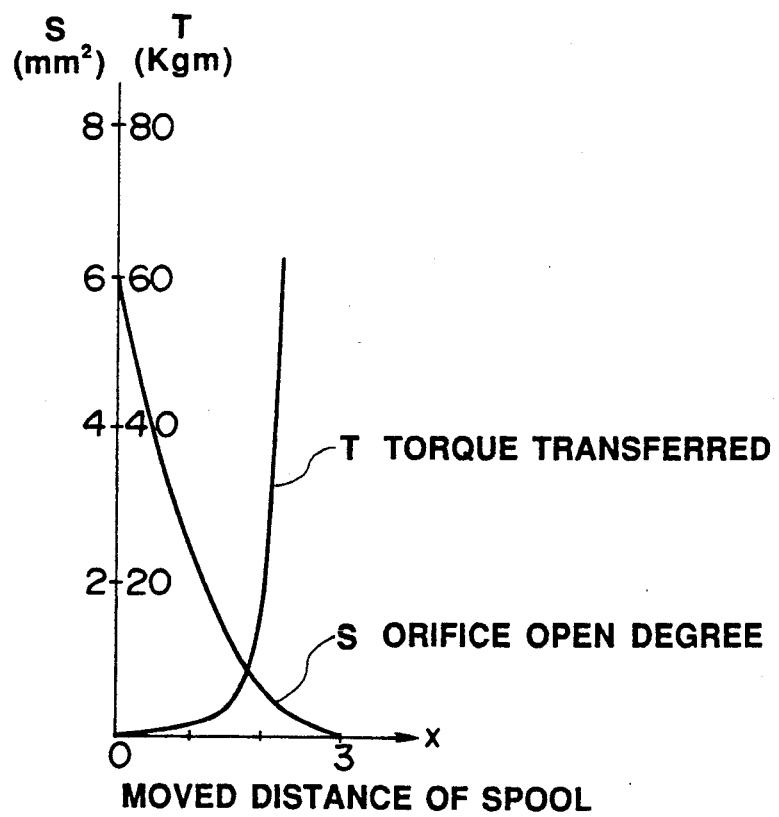
FIG. 12 is a graph similar to FIG. 8, but showing the performance of the coupling of the third embodiment.

The characteristics of the third embodiment are shown in the graph of FIG. 12. As is seen from this graph, the change in the open degree "S" of the orifice 270a to the moved distance "x" of the spool 73 shows respectively the maximum and minimum values when the spool 73 is in the initial and final stages of the closing stroke thereof. In other words, the change rate of the opening area "S" shows respectively the minimum and maximum values when the spool 73 is in the initial and final stages of the opening stroke thereof. That is, the relationship between the open degree of the orifice 270a and the moved distance "x" is depicted by a secondary degree curve, as shown in the graph of FIG. 12.

This means that, in the third embodiment, at the time when the change rate in transferred torque is great (that is, at the final (or initial) stage of the closing (or opening) stroke of the spool 73), a "greater" moved distance is required by the spool 73. Thus, precise torque control operation is assured.

Figure 13:
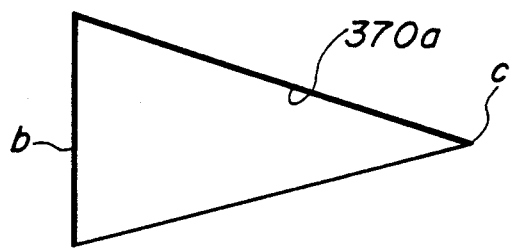
FIGS. 13, 14, 15 and 16 are views similar to FIG. 2, but showing fourth, fifth, sixth and seventh embodiments of the present invention.

Referring to FIG. 13, there is shown a triangular orifice 370a of each balance fluid passage 70 employed in the fourth embodiment of the present invention. In this fourth embodiment, the length of the base side "b" is smaller than the base side "b" of the above-mentioned third embodiment, and the length between the base side "b" and the apex "c" of the orifice 370a is greater than that of the third embodiment. Because of reduction in length of the base side "b", the arrangement of the six balance fluid passages 70 about the cylindrical bore 71a is readily made without inducing undesirable interference therebetween.

Figure 14:
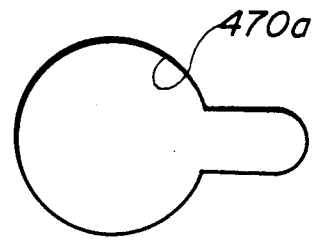
Figure 15:
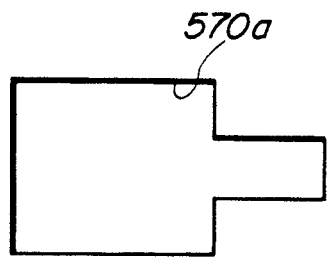
Figure 16:
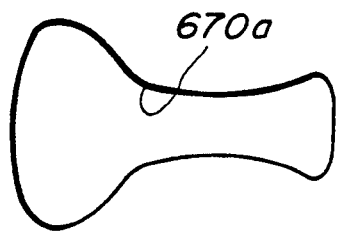

Referring to FIGS. 14, 15 and 16, there are respectively shown orifices 470a, 570a and 670a which are employed in fifth, sixth and seventh embodiments of the present invention. As is seen from these drawings, each of the orifices 470a, 570a and 670a is so shaped as to comprise a larger open area at a left side and a smaller open area at a right side.

It is to be noted that the orifices 470a, 570a and 670a are so oriented in the rotor 40 that the smaller open area is directed toward the rod 74 (see FIG. 5).

Although graphs for showing the characteristics of the fifth, sixth and seventh embodiments are not provided, it will be easily understood that similar characteristics to the third embodiment are obtained from the embodiments. That is, the change in the open area "S" of the orifice 470a, 570a or 670a relative to the moved distance "x" of the spool 73 is small at the final stage of the closing stroke of the spool 73. Thus, substantially the same advantages as those of the third embodiment are obtained from these fifth, sixth and seventh embodiments.

It is to be noted that the range in which the change rate of the open area "S" of the orifice 470a, 570a or 670a is great can be effectively used when the temperature of the oil is relatively low and when it becomes necessary to avoid interference with anti-lock braking system.

Figure 21:
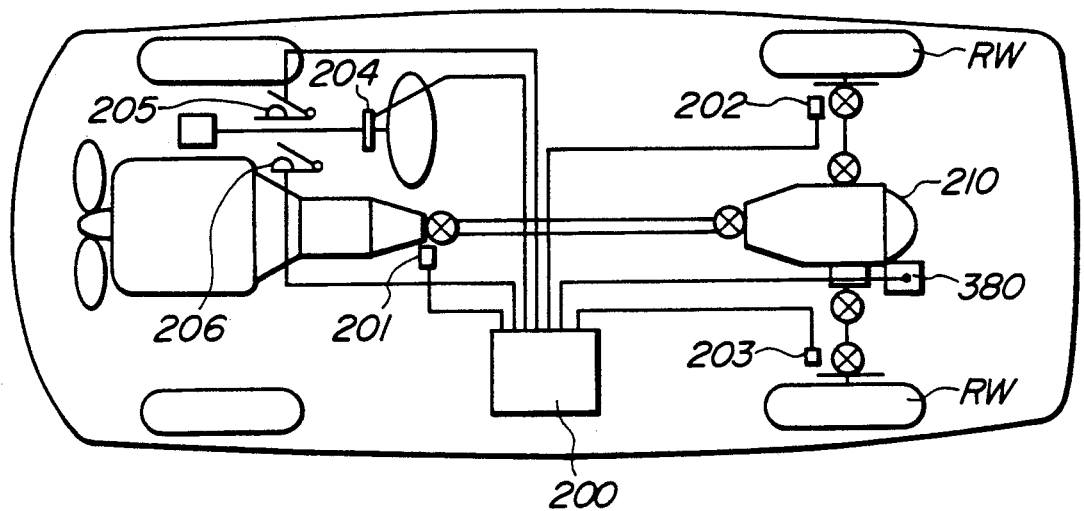
FIG. 21 is a diagrammatically illustrated drive train of a rear drive motor vehicle to which the rear differential of FIG. 17 is practically applied.

Referring to FIG. 21, there is schematically shown a drive train of a rear wheel drive motor vehicle to which the coupling "A'" of eighth embodiment of the present invention is practically applied. That is, the coupling "A'" is used as a slip limiting means for a differential gear 210 arranged between left and right rear drive wheels "RW" and "RW".

In FIG. 21, denoted by numeral 380 is a motor type actuator which controls the characteristic of the coupling "A'" when energized. Denoted by numeral 200 is a control unit by which operation of the actuator 380 is controlled. The control unit 200 receives information signals from a vehicle speed sensor 201, a right rear wheel rotation speed sensor 202, a left rear wheel rotation speed sensor 203, a steering angle sensor 204, a throttle valve sensor 205 and a brake switch 206.

Figure 17:
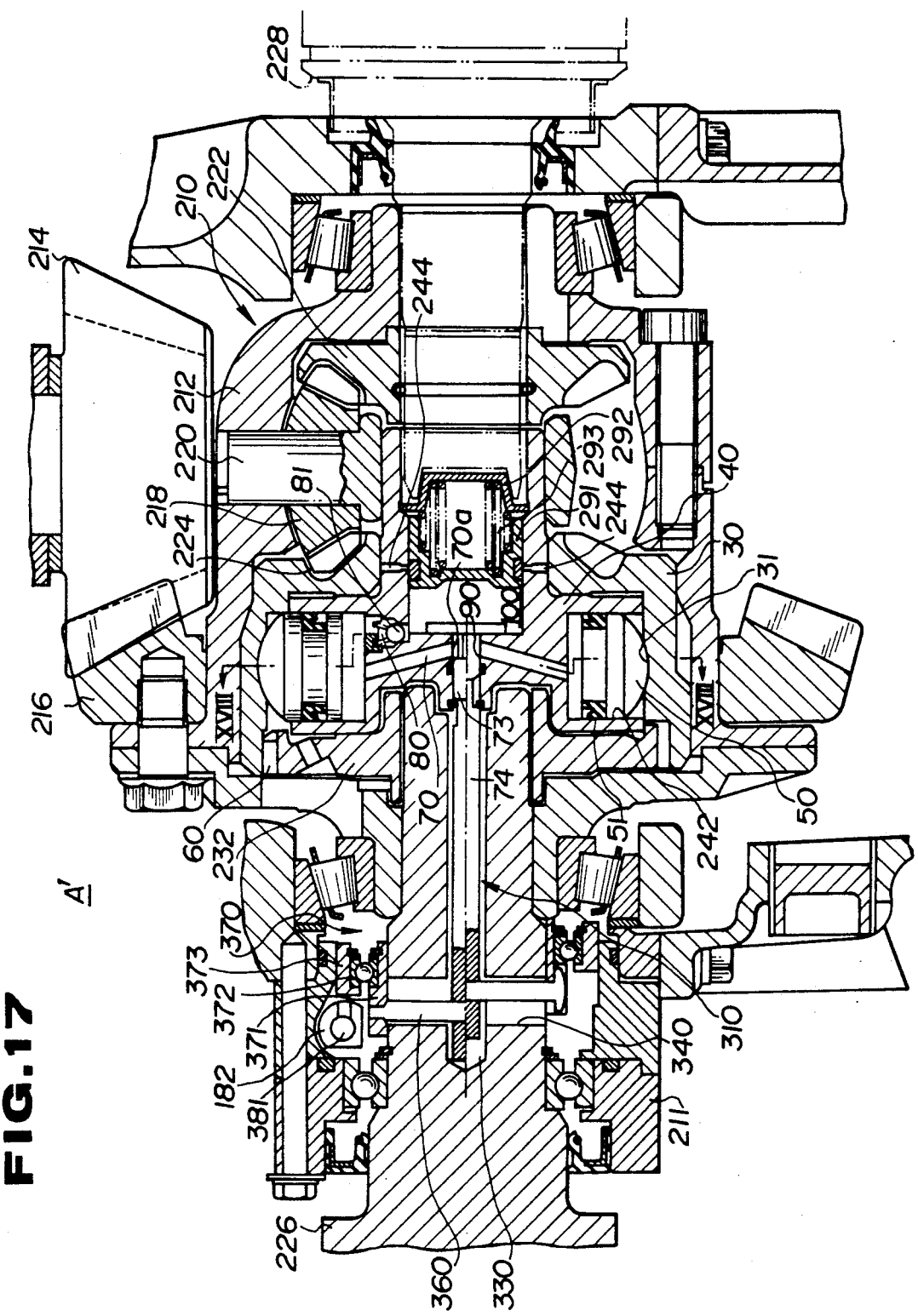
FIG. 17 is a sectional view of a rear differential to which a coupling of an eighth embodiment of the present invention is practically applied.
Figure 18:
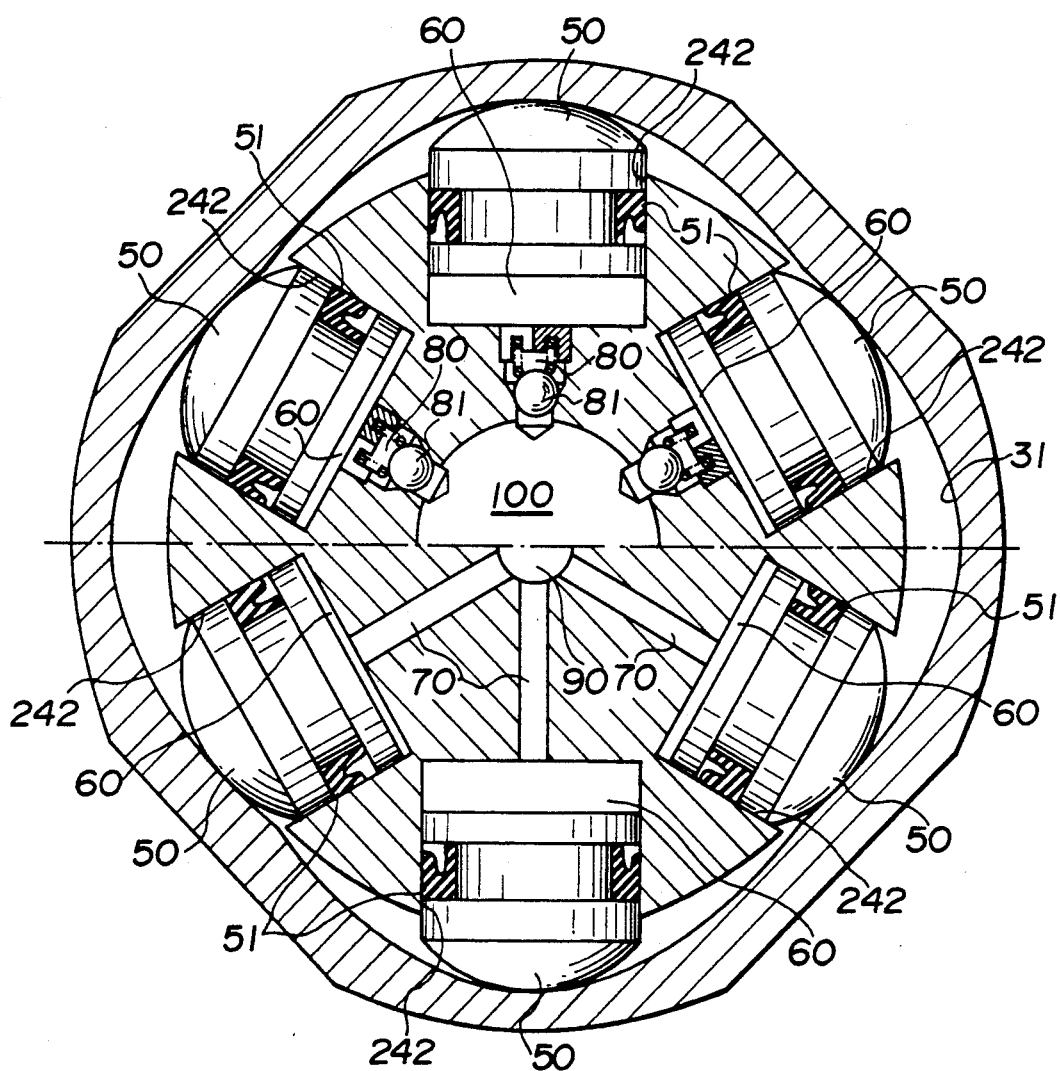
FIG. 18 is a sectional view taken along the line XVIII—XVIII of FIG. 17, showing the coupling of the eighth embodiment.

As is seen from FIG. 17, the differential gear to which the coupling "A'" is applied comprises a differential housing 211, a differential case 212 to which an engine torque is applied through a drive pinion 214 and a ring gear 216, a pinion 218 rotatably supported through a pinion shaft 220, a pair of side gears 222 and 224, and a pair of (viz., left and right) drive shafts 226 and 228.

When no rotation speed difference is produced between the left and right drive shafts 226 and 228, the engine torque is equally applied to these drive shafts 226 and 228. While, when a certain rotation speed difference is produced between the drive shafts 226 and 228, a certain torque is transferred from a higher speed drive shaft 226 or 228 to a lower speed drive shaft 228 or 226. In fact, the torque transferred to the lower speed drive shaft is controlled by the coupling "A'" as will be described in detail in the following.

Similar to the afore-mentioned coupling "A" incorporated with the transfer gear 9 of the 4WD system, the coupling "A'" comprises generally a drive housing 30, a rotor 40, six driving pistons 50, six working chambers 60, six balance fluid passages 70, six regulator relief fluid passages 80, a spool chamber 90 and an accumulator chamber 100, which are arranged in an after-mentioned manner.

The drive housing 30 is splined to the left drive shaft 226 and has an interior defined by a circumferential cam surface wall 31. The rotor 40 is splined to the right drive shaft 228. The six driving pistons 50 are radially movably disposed in respective piston bores 242 of the rotor 40 so that upon occurence of rotation speed difference between the drive housing 30 and the rotor 40, the pistons 50 are forced to move reciprocatively keeping their head portions contacting the cam surface wall 31. In response to the reciprocating movement of the driving pistons 50, the volume of each working chamber 60 is varied.

The spool chamber 90 is communicated with the working chambers through the six balance fluid passages 70. The spool chamber 90 has one end exposed to the accumulator chamber 100 to which the six regulator relief fluid passages 80 are connected. Each of the balance fluid passages 70 has, at a portion exposed to the spool chamber 90, an orifice 70a.

It is to be noted that the orifices 70a of the balance fluid passages 70 may have such various shapes as those which have been described hereinabove in conjunction with FIGS. 2, 9, 11, 13, 14, 15 and 16.

Denoted by numeral 232 is a drive housing cover, 242 is the piston bore for each driving piston 50, 244 is each of relief valve bores, 51 is a seal ring of each driving piston 50, 81 is a one-way valve installed in each regulator fluid passage 80, 291 is a piston operatively disposed in the accumulator chamber 100, 292 is a spring retainer, and 293 is a spring compressed between the piston 291 and the spring retainer 292 to bias the piston 291 in a direction to reduce the volume of the accumulator chamber 100.

Figure 20:
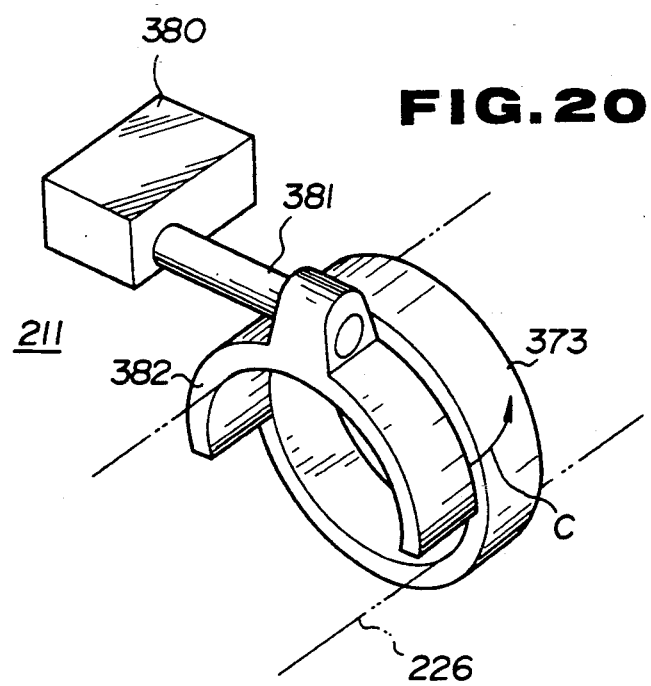
FIG. 20 is a perspective view of an actuator assembly for actuating a spool employed in the coupling of the eighth embodiment.

The open degree of each orifice 70a is varied by an orifice open degree changing means 310 which comprises a spool 73, a center bore 330, a cross bore 340, a push rod 74, a cross rod 360, a slide mechanism 370 and an actuator 380 (see FIG. 20).

The spool chamber 90 is formed in the center of the rotor 40. The spool 73 is axially movably disposed in the spool chamber 90 in a manner to change the open degree of the orifices 70a.

Figure 19:
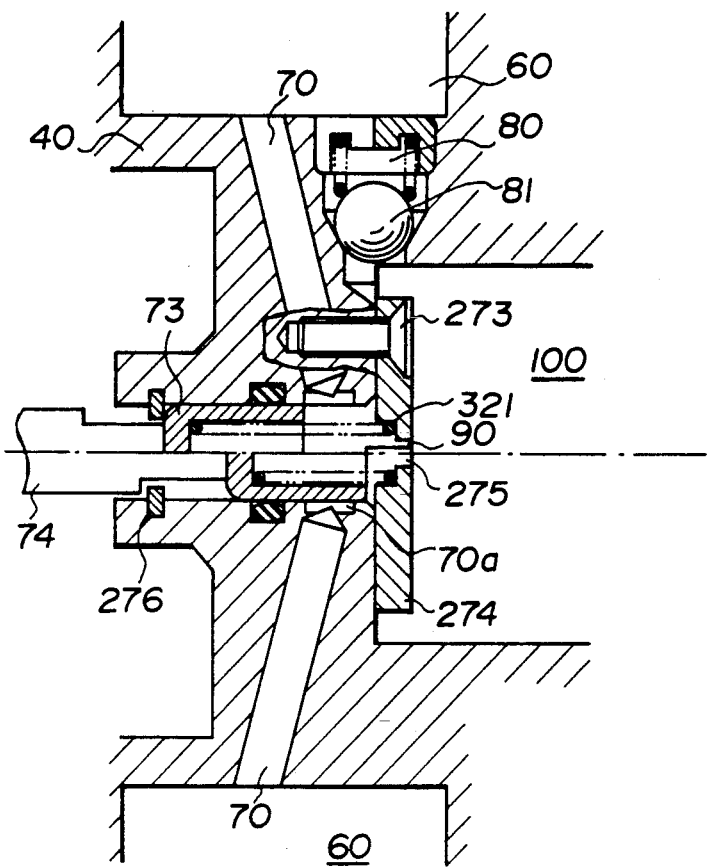
FIG. 19 is an enlarged sectional view of an essential part of the coupling of the eighth embodiment.

As is seen from FIG. 19, the spool 73 is biased by a spring 321 leftward, that is, in a direction to fully open the orifices 70a. The spring 321 has one end seated on a spring retainer 274 which is secured to the rotor 40 by means of bolts 273. The spring retainer 274 has an opening 275 through which the accumulator chamber 100 and the spool chamber 90 are communicated. Within the spool chamber 90, there is fixed a snap ring 276 for restraining the leftward movement of the spool 73.

The center bore 330 is formed in the left drive shaft 226 and communicated with the spool chamber 90.

The cross bore 340 extends radially outwardly from one end portion of the center bore 330 to have diametrically opposed ends exposed to the outside of the left drive shaft 226.

The push rod 74 is axially slidably received in the center bore 330 and has one end integrally connected to the spool 73.

The cross rod 360 is connected to the other end of the push rod 74 and has both ends slightly projected from both open ends of the cross bore 340.

The slide mechanism 370 comprises a sleeve ring 371 which is axially slidably disposed about the left drive shaft 226 and connected to the cross rod 360 to move therewith. A ball bearing 372 is coaxially disposed about the sleeve ring 371, so that a bearing retainer 373 of the ball bearing 372 is permitted to rotate relative to the sleeve ring 371.

The actuator 380 is secured to the differential housing 211. As is seen from FIG. 20, the actuator 380 has an output shaft 381. The output shaft 381 is rotated about its axis upon energization of the actuator 380. A semicircular fork 382 is connected to the output shaft 381 to pivot therewith. The fork 382 is arranged to partially embrace the left drive shaft 226 at a position near the bearing retainer 373.

In the following, operation will be described.

When, due to driving on rough roads, sticking of one rear road wheel in the mud, or the like, a rotation speed difference takes place between the left and right rear drive wheels "RW" and "RW", there is produced a relative rotation between the drive housing 30 and the rotor 40. With this relative rotation, the driving pistons 50 are forced to move reciprocatively in the respective piston bores 242. When, due to inward movement of each driving piston 50, the volume of the working chamber 60 is reduced, the hydraulic pressure in the working chamber 60 is increased by the oil flow resisting function of the spool 73. Thus, each driving piston 50 is forced to abut against the cam surface wall 31 with a certain force which is produced by multiplying the increased degree of the pressure in the working chamber 60 by the pressure receiving surface area of the piston 50. Thus, the torque distribution is so made that a higher torque is transferred to a lower speed drive shaft 226 or 228 and a lower torque is transferred to a higher speed drive shaft 228 or 226.

Similar to the case of the afore-mentioned coupling "A", the torque transfer characteristic of the coupling "A'" is controlled by the axial movement of the spool 73, that is, by changing the open degree of the orifices 70a of the six balance fluid passages 70.

Figure 22:
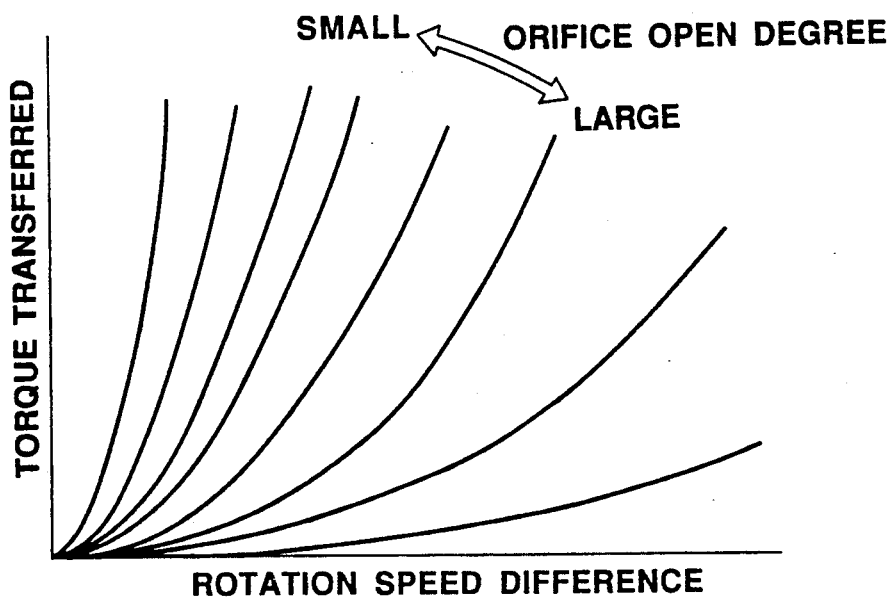
FIG. 22 is a graph showing a torque transfer characteristic of the rear differential to which the coupling of the eighth embodiment is applied.

That is, as is seen from FIG. 20, when, due to energization of the actuator 380, the fork 382 is pivoted in the direction of the arrow "C", the bearing retainer 373 of the slide mechanism 370 is moved rightward in FIG. 17. With this, the cross rod 360 and the push rod 330 are moved rightward to assume their rightmost positions as illustrated by lower halves of them in the drawing. During this movement, the open degree of the orifices 70a is reduced by the spool 73. When the open degree becomes small, the torque transfer characteristic shows a sharp change as shown by the graph of FIG. 22.

When thereafter the actuator 380 is energized to operate in a reversed manner, the fork 382 is returned to the position as shown in FIG. 20. With this, the bearing retainer 373 is moved leftward in FIG. 17 increasing the open degree of the orifices 70a. This leftward movement is assisted by the spring 321. Under this condition, the torque transfer characteristic shows a dull change as shown by the graph of FIG. 22.

It is to be noted that, even if the spring 321 is not provided, the leftward movement of the spool 73 is obtained due to a certain hydraulic pressure created in the accumulator chamber 100.

The operation of the actuator 380 is controlled by the control unit 200 in the following manner.

When, by receiving information signals from the sensors 201 to 206, an initial stage of a corner turning of a vehicle is sensed, the control unit 200 operates the actuator 380 in a manner to cause the coupling "A'" to exhibit the dully changing characteristic. With this, the turning performance of the vehicle is improved. When a final stage of the vehicle turning is sensed, the control unit 200 operates the actuator 380 in a manner to cause the coupling "A'" to exhibit the sharply changing characteristic. With this, the dashing performance of the vehicle is improved.

When the control unit 200 senses that the vehicle is moving on a rough road or one of rear road wheels sticks in the mud, the control unit 200 operates the actuator 380 in a manner to cause the coupling "A'" to exhibit the sharply changing characteristic.

When, in a motor vehicle having an anti-lock braking system (ABS) mounted therein, the control unit 200 senses that a braking takes place under a condition wherein one of the rear road wheels "RW" and "RW" is on a slippery surface, the control unit 200 operates in such a manner that the coupling "A'" exhibits the dully changing characteristic. With this, not only undesired lock of the road wheel on the slippery surface is suppressed, but also braking performance of the other road wheel which has traction is assured.

In the following, advantages of the coupling "A'" of the eighth embodiment will be described.

(1) Since the push rod 74 and the spool 73 are arranged to be coaxial with the axis of the left drive shaft 226 and the actuator 380 (which actuates the push rod 74 and the spool 73) is mounted to a nonrotational member (viz., differential housing 211) at a position radially outwardly spaced from the left drive shaft 226, the coupling "A'" can be compactly set in the differential gear 210.

(2) Since the actuator 380 is mounted to the nonrotational member 211 (viz., differential housing), the durability of the actuator 380 is assured.

(3) Since the spool chamber 90 in which the spool 73 is disposed is formed in the rotational center of the rotor 40, the rotation of the left drive shaft 226 does not cause unbalanced stay of the spool 73 in the spool chamber 90. This means that the axial movement of the spool 73 in the spool chamber 90 is smoothly made.

(4) Since the actuator 380 is located near the coupling "A'", a quick actuation for the spool 73 is achieved by the push rod 74 and the cross rod 360.

(5) Since the spool 73 is constantly biased by the spring 321 in the direction to fully open the orifices 70a, the movement of the spool 73 in the opposite direction is stably made without play.

What is claimed is:

1. A coupling for use between first and second rotatable members, comprising:
    a drive housing connected to said first rotatable member to rotate therewith, said housing having on its inner surface a cam surface wall;
    a rotor rotatably received in said drive housing, said rotor having radially extending piston bores formed therein;
    driving pistons respectively received in said piston bores thereby to define working chambers in the piston bores, said working chambers being filled with oil causing head portions of said driving pistons to slidably contact with said cam surface wall;
    means defining in a rotation center portion of said rotor a spool chamber;
    first passage means connecting each of said working chambers with said spool chamber, said first passage means including a non-circular orifice exposed to said spool chamber;
    second passage means connecting each of said working chambers with said spool chamber, said second passage means including a check means by which only one-way flow of oil from said spool chamber to the working chamber is permitted;
    a spool slidably disposed in said spool chamber, said spool varying the open degree of said orifice when moved axially between a closed position and an open position;
    means defining an accumulator chamber which is merged with said spool chamber;
    third passage means connecting said accumulator chamber with a drain chamber, said drain chamber being bounded by said cam surface wall, a peripheral wall of said rotor and said head portions of the driving pistons;
    a spool actuating means which includes an electric actuator, and a movement transmitting mechanism extending between said spool and said electric actuator, so that upon energization of said electric actuator, said mechanism moves said spool between said closed position and said open position; and
    wherein said movement mechanism comprises:
        a rod member axially movably disposed in a bore formed in said second rotatable member, said rod member having one end secured to said spool and the other end exposed to the outside of said bore;
        a sleeve ring axially slidably disposed on said second rotatable member and having the exposed portion of the rod member secured thereto;
        a ball bearing having an inner race tightly disposed about said sleeve ring;
        a bearing retainer tightly disposed about an outer race of said ball bearing; and
        a fork connected to an output part of said electric actuator to be driven by the same, said fork moving said bearing retainer axially when driven by said electric actuator.

2. A coupling for use between first and second rotatable members, comprising:
    a drive housing connected to said first rotatable member to rotate therewith, said housing having on its inner surface a cam surface wall;
    a rotor rotatably received in said drive housing and connected to said second rotatable member to rotate therewith, said rotor having radially extending piston bores formed therein;
    driving pistons respectively received in said piston bores thereby to define working chambers in the piston bores, said working chamber being filled with oil causing head portions of said driving pistons to slidably contact with said cam surface wall;
    means defining in a rotation center portion of said rotor a spool chamber;
    first passage means connecting each of said working chambers with said spool chamber, said first passage means including an orifice exposed to said spool chamber, said orifice being non-circular in shape;
    second passage means connecting each of said working chambers with said spool chamber, said second passage means including a check means by which only one-way flow of oil from said spool chamber to the working chamber is permitted;
    a spool slidably disposed in said spool chamber, said spool varying the open degree of said orifice when moved axially between a closed position and an open position;
    means defining an accumulator chamber which is merged with said spool chamber;
    third passage means connecting said accumulator chamber with a drain chamber, said drain chamber being bounded by said cam surface wall, a peripheral wall of said rotor and said head portions of the driving pistons; and
    a spool actuating means which includes an electric actuator, and a movement transmitting mechanism extending between said spool and said electric actuator, so that upon energization of said electric actuator, said mechanism moves said spool between said close position and said open position,
    wherein said movement transmitting mechanism comprises:
        a rod member axially movably disposed in a bore formed in said second rotatable member, said rod member having one end secured to said spool and the other end exposed to the outside of said bore;
        a sleeve ring axially slidably disposed on said second rotatable member and having the exposed portion of the rod member secured thereto;
        a ball bearing having an inner race tightly disposed about said sleeve ring;
        a bearing retainer tightly disposed about an outer race of said ball bearing; and
        a fork connected to an output part of said electric actuator to be driven by the same, said fork moving said bearing retainer axially when driven by said electric actuator.

* * * * *